US007877620B2

(12) United States Patent
Gara et al.

(10) Patent No.: US 7,877,620 B2
(45) Date of Patent: Jan. 25, 2011

(54) MANAGING POWER IN A PARALLEL COMPUTER

(75) Inventors: Alan Gara, Mount Kisco, NY (US); Thomas M. Gooding, Rochester, MN (US); Todd A. Inglett, Rochester, MN (US); Thomas A. Liebsch, Arlington, SD (US); Thomas E. Musta, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 11/840,743

(22) Filed: Aug. 17, 2007

(65) Prior Publication Data

US 2009/0049317 A1 Feb. 19, 2009

(51) Int. Cl.
G06F 1/26 (2006.01)
(52) U.S. Cl. .................. 713/320; 713/300; 713/310; 713/340
(58) Field of Classification Search .................. 713/300, 713/310, 322, 323, 320, 340
See application file for complete search history.

(56) References Cited

U.S. PATENT DOCUMENTS

| 5,535,401 | A | * | 7/1996 | Rawson et al. .............. 713/340 |
| 5,717,319 | A | * | 2/1998 | Jokinen ...................... 323/280 |
| 5,864,225 | A | | 1/1999 | Bryson |
| 5,894,579 | A | * | 4/1999 | Fujihara ..................... 713/324 |
| 6,891,736 | B2 | * | 5/2005 | Takemura et al. ............. 363/65 |
| 7,356,393 | B1 | * | 4/2008 | Schlatre et al. ............... 701/33 |
| 7,536,567 | B2 | * | 5/2009 | Bonola et al. ................ 713/300 |
| 7,541,793 | B2 | * | 6/2009 | Saeueng et al. ............. 323/284 |
| 7,636,863 | B2 | * | 12/2009 | Oh ............................. 713/320 |
| 2003/0146991 | A1 | * | 8/2003 | Barna et al. .................. 348/302 |
| 2003/0218384 | A1 | | 11/2003 | Yoneda |
| 2005/0216775 | A1 | * | 9/2005 | Inoue ......................... 713/300 |
| 2006/0197857 | A1 | * | 9/2006 | Barna et al. .................. 348/308 |
| 2006/0288241 | A1 | * | 12/2006 | Felter et al. .................. 713/300 |
| 2008/0301475 | A1 | * | 12/2008 | Felter et al. .................. 713/300 |
| 2009/0240963 | A1 | * | 9/2009 | Zimmer et al. .............. 713/310 |

FOREIGN PATENT DOCUMENTS

WO 0039661 A1 7/2000

* cited by examiner

*Primary Examiner*—Thomas Lee
*Assistant Examiner*—Zahid Choudhury
(74) *Attorney, Agent, or Firm*—Biggers & Ohanian, LLP

(57) ABSTRACT

Managing power in a parallel computer, the parallel computer including a power supply and a plurality of compute nodes, the plurality of compute nodes powered by the power supply through a plurality of DC-DC converters, each DC-DC converter supplying current to an assigned group of compute nodes, each DC-DC converter having a current sensor. Embodiments include monitoring, by the current sensor, an amount of current supplied by that DC-DC converter to its assigned group of compute nodes; determining, by at least one DC-DC converter, that the amount of current supplied is greater than a predefined threshold value; sending, by the at least one DC-DC converter to the plurality of compute nodes, a global interrupt, including notifying the plurality of compute nodes to reduce power consumption; and reducing, by the plurality of compute nodes in accordance with power consumption ratios, power consumption of the compute nodes.

20 Claims, 7 Drawing Sheets

MANAGING POWER IN A PARALLEL COMPUTER

BACKGROUND OF THE INVENTION

1. Field of the Invention

The field of the invention is data processing, or, more specifically, methods, apparatus, and products for managing power in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously.

Because a parallel computer may include many thousands of compute nodes operating simultaneously during a job, a parallel computer may consume a large amount of power. Electricity providers typically charge a customer at a higher rate than normal after the customer consumes an amount of power greater than a particular amount, the peak power amount. Parallel computers, due to the large number of compute nodes that operate simultaneously during a job, often consume more than the peak power amount. As such, readers will appreciate that room for improvement exists in managing power in a parallel computer.

SUMMARY OF THE INVENTION

Methods, apparatus, and products are disclosed for managing power in a parallel computer, the parallel computer including a power supply and a plurality of compute nodes, each compute node including a computer processor and computer memory operatively coupled to the computer processor, the plurality of compute nodes powered by the power supply through a plurality of direct current to direct current ('DC-DC') converters, each DC-DC converter supplying current to an assigned group of compute nodes, each DC-DC converter having a current sensor. Embodiments include monitoring, by the current sensor in each DC-DC converter, an amount of current supplied by that DC-DC converter to its assigned group of compute nodes; determining, by at least one DC-DC converter, that the amount of current supplied to its assigned group of compute nodes is greater than a predefined threshold value; sending, by the at least one DC-DC converter to the plurality of compute nodes in response to the determination that the amount of current supplied to its assigned group of compute nodes is greater than the predetermined threshold value, a global interrupt, including notifying the plurality of compute nodes to reduce power consumption; and responsive to the notification to reduce power consumption, reducing, by the plurality of compute nodes in accordance with power consumption ratios, power consumption of the compute nodes, the power consumption ratios including a computer processor power consumption ratio and a computer memory power consumption ratio.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
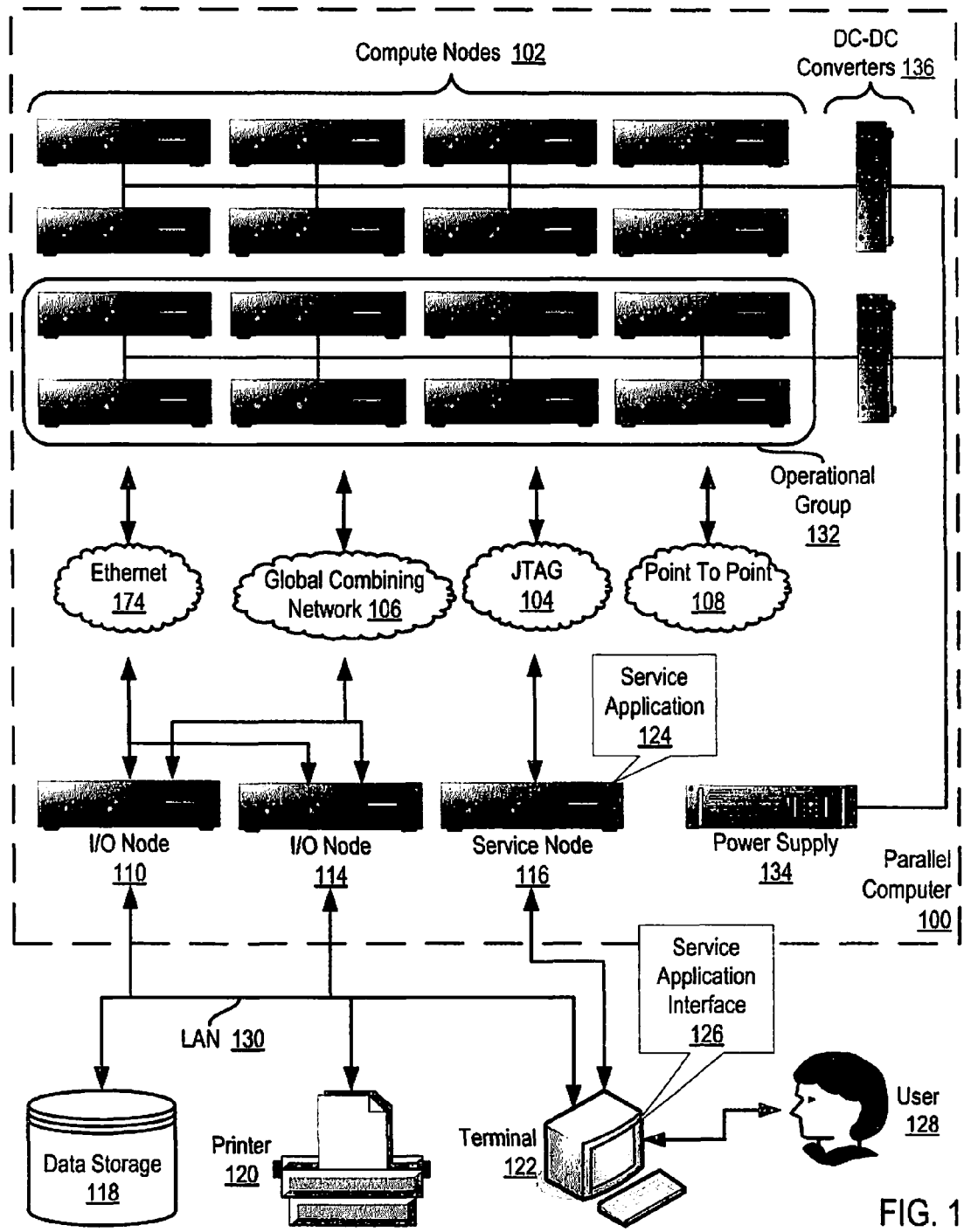
FIG. 1 illustrates an exemplary system for managing power in a parallel computer according to embodiments of the present invention.

Exemplary methods, apparatus, and computer program products for managing power in a parallel computer according to embodiments of the present invention are described with reference to the accompanying drawings, beginning with FIG. 1. FIG. 1 illustrates an exemplary system for managing power in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes. An operational group of compute nodes is a subset of all compute nodes and I/O nodes in the parallel computer that participate in carrying out a job. Operational groups may be configured for collective parallel operations or point-to-point operations.

Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174, 106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for managing power in a parallel computer according to embodiments of the present invention. The system of FIG. 1 includes a power supply (134) that powers the compute nodes (102) through a plurality of direct current to direct current ('DC-DC') converters (136). Each DC-DC converter of FIG. 1 is configured with a current sensor. Each DC-DC converter supplies current to an assigned group compute nodes. Although each DC-DC converter (136) in the system is depicted as supplying current to eight compute nodes readers of skill in the art will recognize that DC-DC converters useful for managing power in a parallel computer according to embodiments of the present invention may supply current to an assigned group comprising any number of compute nodes. In some embodiments, for example, five DC-DC converters supply power to a group of 32 computer processors in 32 compute nodes while three other DC-DC converters supply power to computer memory in each of the same 32 compute nodes.

The system of FIG. 1 operates generally for managing power in a parallel computer according to embodiments of the present invention. The system of FIG. 1 is capable of monitoring, by the current sensor in each DC-DC converter, an amount of current supplied by that DC-DC converter to its assigned group of compute nodes; determining, by at least one DC-DC converter, that the amount of current supplied to its assigned group of compute nodes is greater than a predefined threshold value; sending, by the at least one DC-DC converter to the plurality of compute nodes in response to the determination that the amount of current supplied to its assigned group of compute nodes is greater than the predetermined threshold value, a global interrupt, including notifying the plurality of compute nodes to reduce power consumption; and responsive to the notification to reduce power consumption, reducing, by the plurality of compute nodes in accordance with power consumption ratios, power consumption of the compute nodes, the power consumption ratios including a computer processor power consumption ratio and a computer memory power consumption ratio.

Power consumption ratios are parameters for controlling a compute nodes node's power consumption during execution of computer program instructions. The power consumption ratios may be expressed as a ratio of execution cycles to idle cycles. An execution cycle is the period in which the computer memory or computer processor executes an instruction. That is, an execution cycle is the period in which the computer memory or computer processor is active. An idle cycle, in contrast, is a period in which the computer processor or computer memory is idle, that is, not executing any instruction. When idling, neither the computer processor nor the computer memory is consuming power, thereby reducing the compute node's power consumption.

The arrangement of nodes, networks, and I/O devices making up the exemplary system illustrated in FIG. 1 are for explanation only, not for limitation of the present invention. Data processing systems capable of managing power in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of managing power in a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Managing power in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in managing power in a parallel computer according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message for transmission to another compute node.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Also stored in RAM (156) is a power management application program (158) a module of compute program instructions capable of managing power in a parallel computer according to embodiments of the present application. The power management application program (158) of FIG. 2 includes computer program instructions capable of reducing power consumption of the compute node (152) in accordance with the power consumption ratios (626), including a computer processor power consumption ratio (628) and a computer memory power consumption ratio (630). Power consumption ratios are parameters for controlling a compute node's power consumption during execution of computer program instructions. The power management application program reduces power consumption of the compute node (152) in response to notification received from a DC-DC converter.

Figure 2:
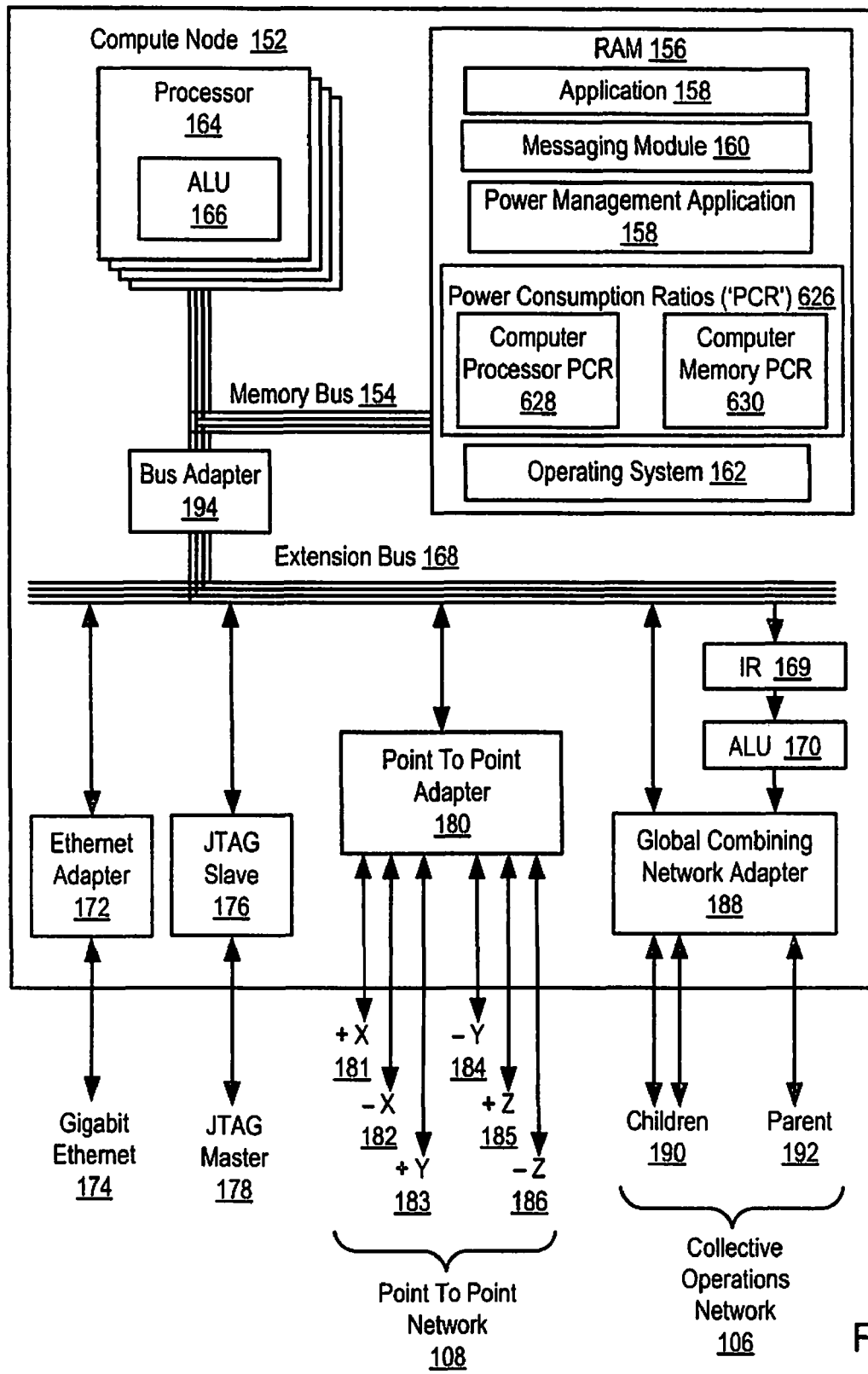
FIG. 2 sets forth a block diagram of an exemplary compute node useful in managing power in a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for managing power in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in managing power in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

Figure 3A:
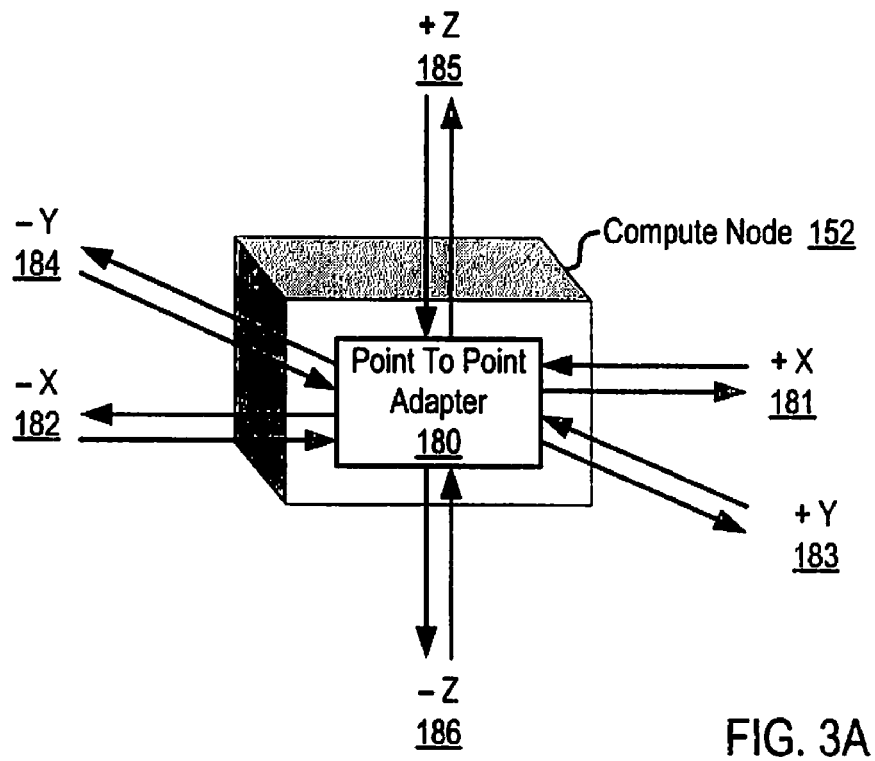
FIG. 3A illustrates an exemplary Point To Point Adapter useful in systems capable of managing power in a parallel computer according to embodiments of the present invention.

For further explanation, FIG. 3A illustrates an exemplary Point To Point Adapter (180) useful in systems capable of managing power in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
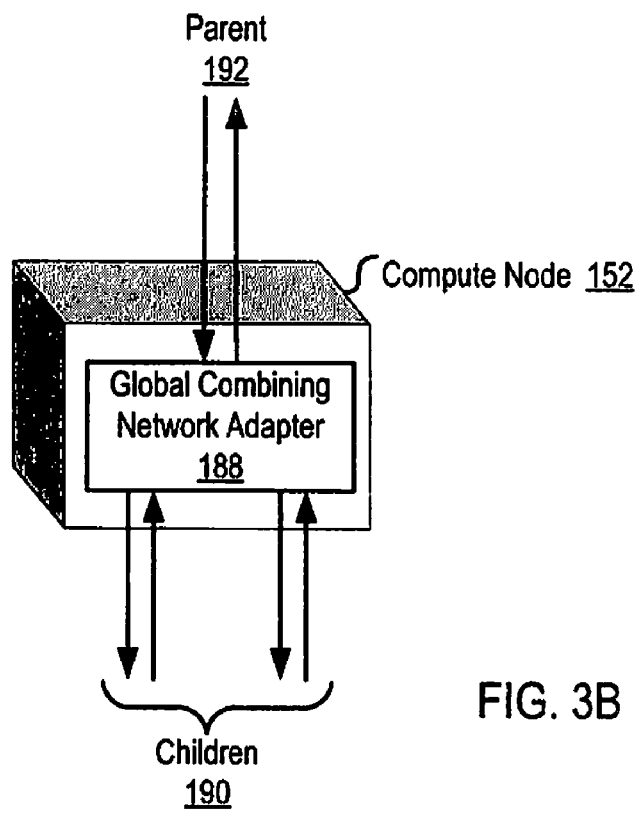
FIG. 3B illustrates an exemplary Global Combining Network Adapter useful in systems capable of managing power in a parallel computer according to embodiments of the present invention.

For further explanation, FIG. 3B illustrates an exemplary Global Combining Network Adapter (188) useful in systems capable of managing power in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
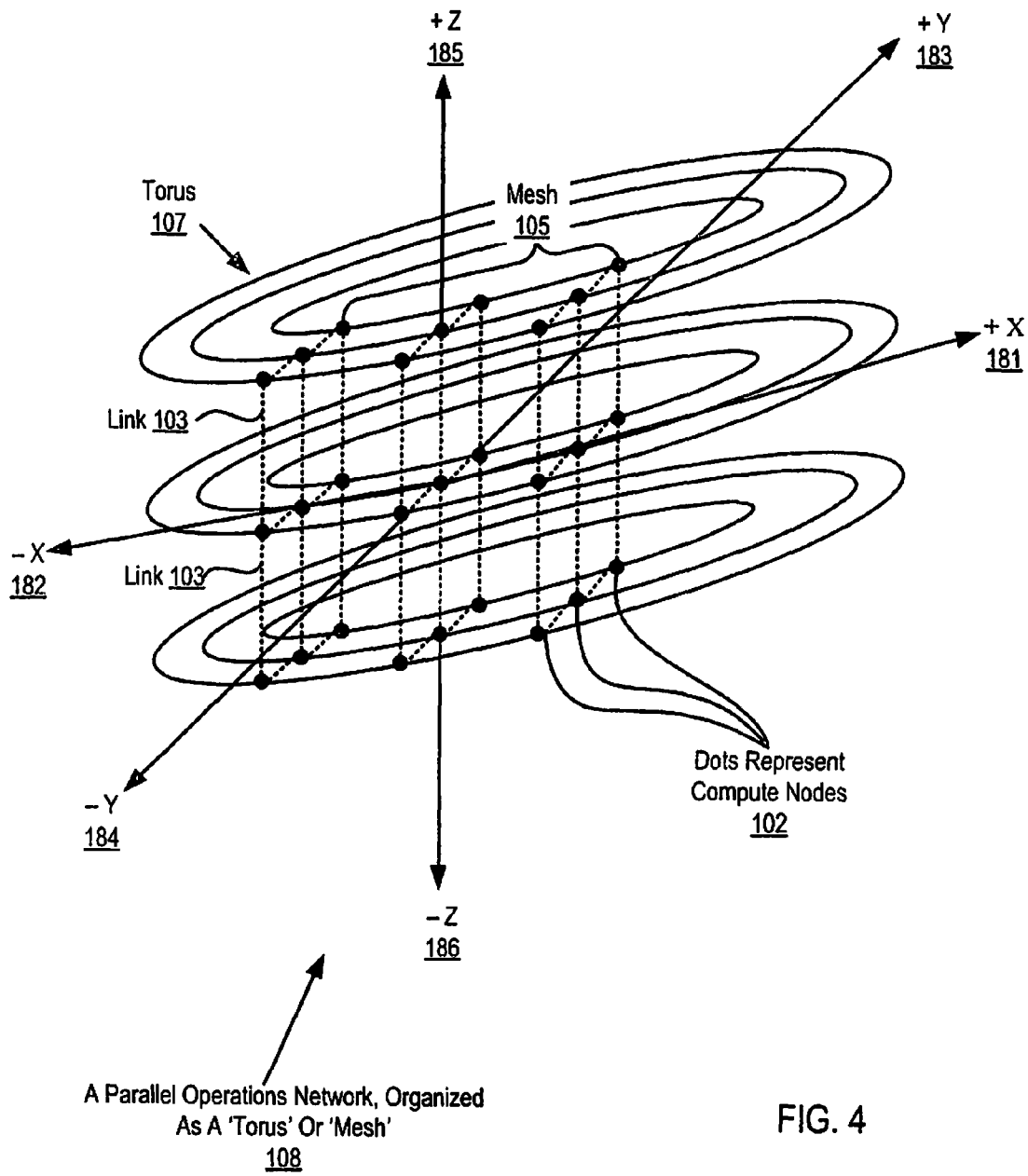
FIG. 4 sets forth a line drawing illustrating an exemplary data communications network optimized for point to point operations useful in systems capable of managing power in a parallel computer in accordance with embodiments of the present invention.

For further explanation, FIG. 4 sets forth a line drawing illustrating an exemplary data communications network (108) optimized for point to point operations useful in systems capable of managing power in a parallel computer in accordance with embodiments of the present invention. In the example of FIG. 4, dots represent compute nodes (102) of a parallel computer, and the dotted lines between the dots represent data communications links (103) between compute nodes. The data communications links (103) are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in managing power in a parallel computer in accordance with embodiments of the present invention may contain only a few compute nodes or may contain thousands of compute nodes.

Figure 5:
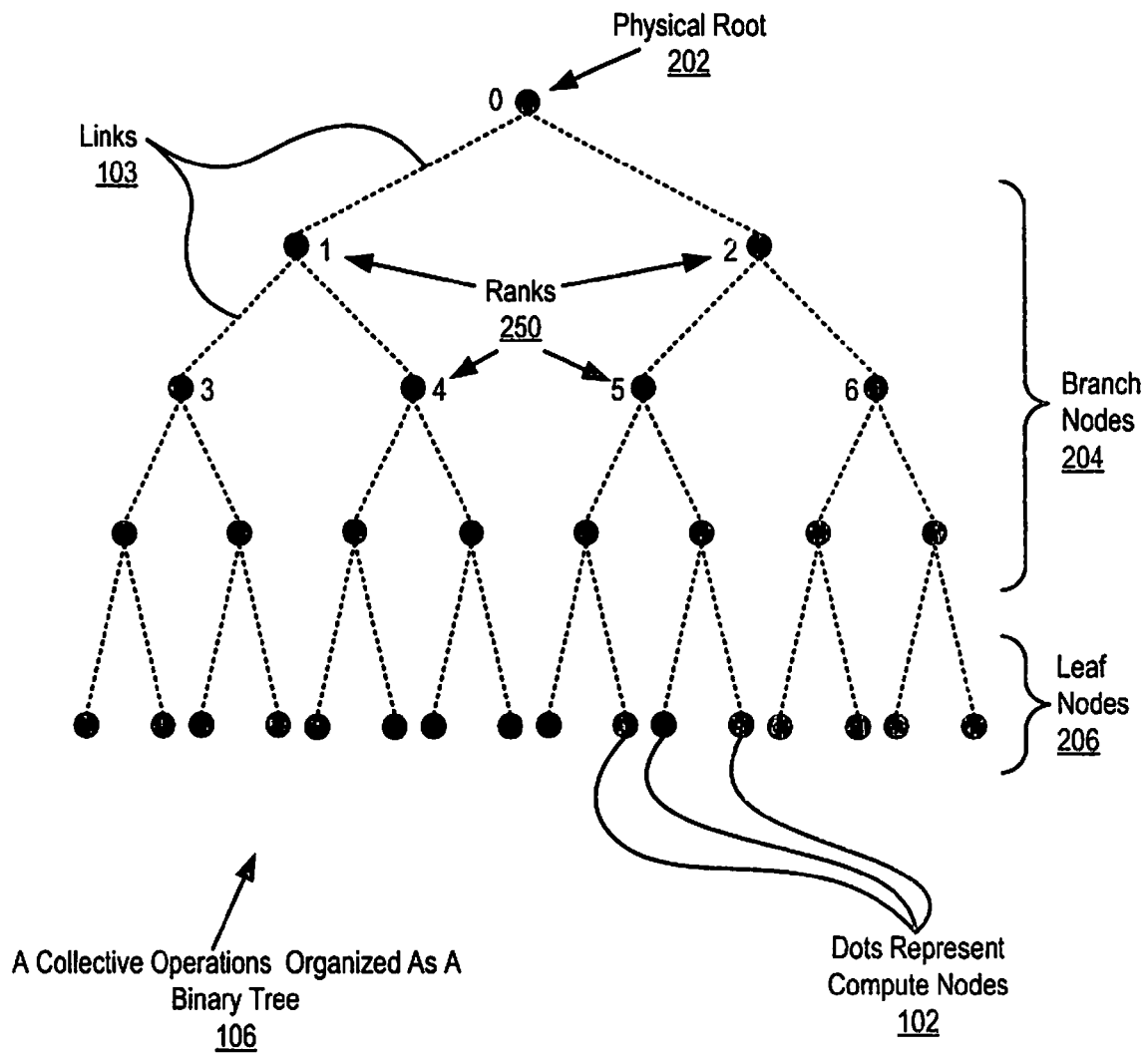
FIG. 5 sets forth a line drawing illustrating an exemplary data communications network optimized for collective operations useful in systems capable of managing power in a parallel computer in accordance with embodiments of the present invention.

For further explanation, FIG. 5 sets forth a line drawing illustrating an exemplary data communications network (106) optimized for collective operations useful in systems capable of managing power in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for managing power in a parallel computer with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
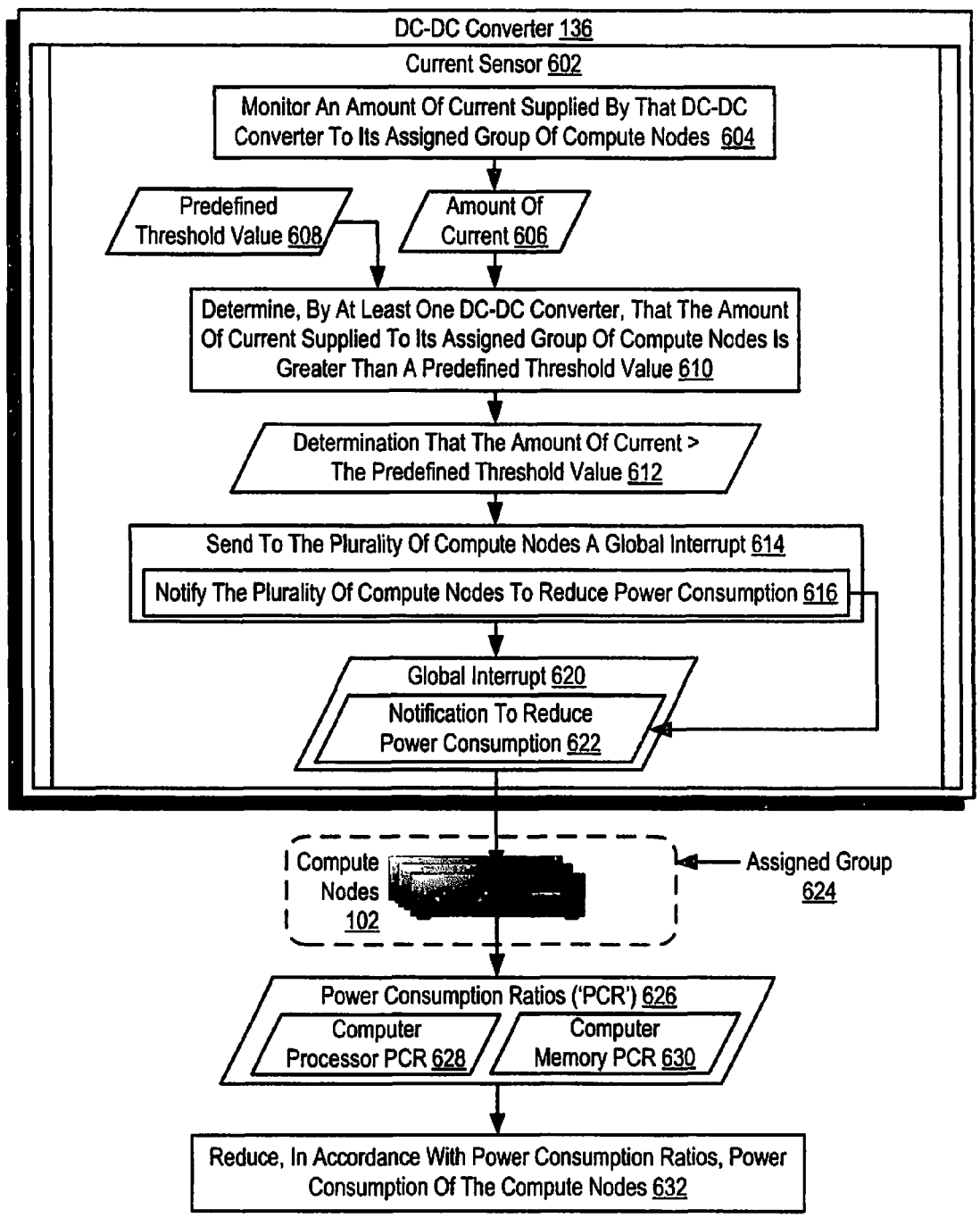
FIG. 6 sets forth a flow chart illustrating an exemplary method for managing power in a parallel computer according to embodiments of the present invention.

For further explanation, FIG. 6 sets forth a flow chart illustrating an exemplary method for managing power in a parallel computer according to embodiments of the present invention. The parallel computer includes a plurality of compute nodes (102). Each compute node (102) includes a computer processor and computer memory operatively coupled to the computer processor. The parallel computer also includes a power supply (134 on FIG. 1) that powers the compute nodes (102) through a plurality of DC-DC converters (136). Each DC-DC converter (136) supplies current to an assigned group (624) of compute nodes (102). Each DC-DC converter includes a current sensor (602). In some embodiments the plurality of compute nodes (102) are connected for data communications through a plurality of data communications networks. The plurality data communications networks may include a data communications network optimized for point to point data communications (104 on FIG. 1). The plurality of data communications networks may also include a data communications network optimized for collective operations (106 on FIG. 1).

The method of FIG. 6 includes monitoring (604), by the current sensor (602) in each DC-DC converter (136), an amount (606) of current supplied by that DC-DC converter (136) to its assigned group (624) of compute nodes (102). Monitoring (604), by the current sensor (602) in each DC-DC converter (136), an amount (606) of current supplied by that DC-DC converter (136) to its assigned group (624) of compute nodes (102) may be carried out by periodically summing the amounts of current supplied to each individual compute node (102) in the assigned group (624).

The current sensor (602) in the DC-DC converter (136), for example, may be configured to continually sense the current supplied to each compute in its assigned group. If a DC-DC converter supplies current to 8 different compute nodes then the current sensor continually senses 8 different amounts of current, one amount for each compute node in the assigned group.

The method of FIG. 6 also includes determining (610), by at least one DC-DC converter (136), that the amount (606) of current supplied to its assigned group (624) of compute nodes (102) is greater than a predefined threshold value (608). Determining (610), by at least one DC-DC converter (136), that the amount (606) of current supplied to its assigned group (624) of compute nodes (102) is greater than a predefined threshold value (608) may be carried out by periodically comparing the amount of current (606) and the predefined threshold value (608). DC-DC converters useful for managing power in a parallel computer according to embodiments of the present invention may be configured with a predefined threshold value. The predefined threshold value represents the maximum amount of current a DC-DC converter may supply to its assigned group before a reduction in power consumption in the compute nodes is required.

Although many DC-DC converters may supply power to many assigned groups of compute nodes in a parallel computer it is only necessary that one DC-DC converter determine that the predefined threshold has been exceeded. That is, a single DC-DC converter may initiate a power reduction in many compute nodes, even compute nodes not part of that DC-DC converter's assigned group.

The method of FIG. 6 also includes sending (614), by the at least one DC-DC converter (136) to the plurality of compute nodes (102) in response to the determination (612) that the amount of current supplied to its assigned group of compute nodes is greater than the predetermined threshold value, a global interrupt (620), including notifying (616) the plurality of compute nodes (102) to reduce power consumption. Sending (614), by the at least one DC-DC converter (136) to the plurality of compute nodes (102) in response to the determination (612) that the amount of current supplied to its assigned group of compute nodes is greater than the predetermined threshold value, a global interrupt (620), including notifying (616) the plurality of compute nodes (102) to reduce power consumption is carried out by raising the global interrupt on a global interrupt network. A global interrupt network is a network connecting compute nodes and other devices in the parallel computer that allows a single compute node or device to raise an interrupt on all compute nodes connected to the network. Global interrupt networks useful for managing power in a parallel computer according to embodiments of the present invention may be implemented in many topologies as will occur to those of skill in the art including, for example, a tree topology. When a global interrupt is raised at any point within the network the global interrupt is propagated throughout the network to all compute nodes.

The method of FIG. 6 also includes, responsive to the notification (622) to reduce power consumption, reducing (632), by the plurality of compute nodes (102) in accordance with power consumption ratios (626), power consumption of the compute nodes (102), the power consumption ratios (626) including a computer processor power consumption ratio (628) and a computer memory power consumption ratio (630). Reducing power consumption of the compute nodes may be carried out by operating the computer processor and computer memory in accordance with the power consumption ratios.

Power consumption ratios are parameters for controlling a compute node's power consumption during execution of computer program instructions. The power consumption ratios are expressed as a ratio of execution cycles to idle cycles. An execution cycle is the period in which the computer memory or computer processor executes an instruction. That is, an execution cycle is the period in which the computer memory or computer processor is active. An idle cycle, in contrast, is a period in which the computer processor or computer memory is idle, that is, not executing any instruction. When idling, neither the computer processor nor the computer memory is consuming power, thereby reducing the compute node's power consumption.

Figure 7:
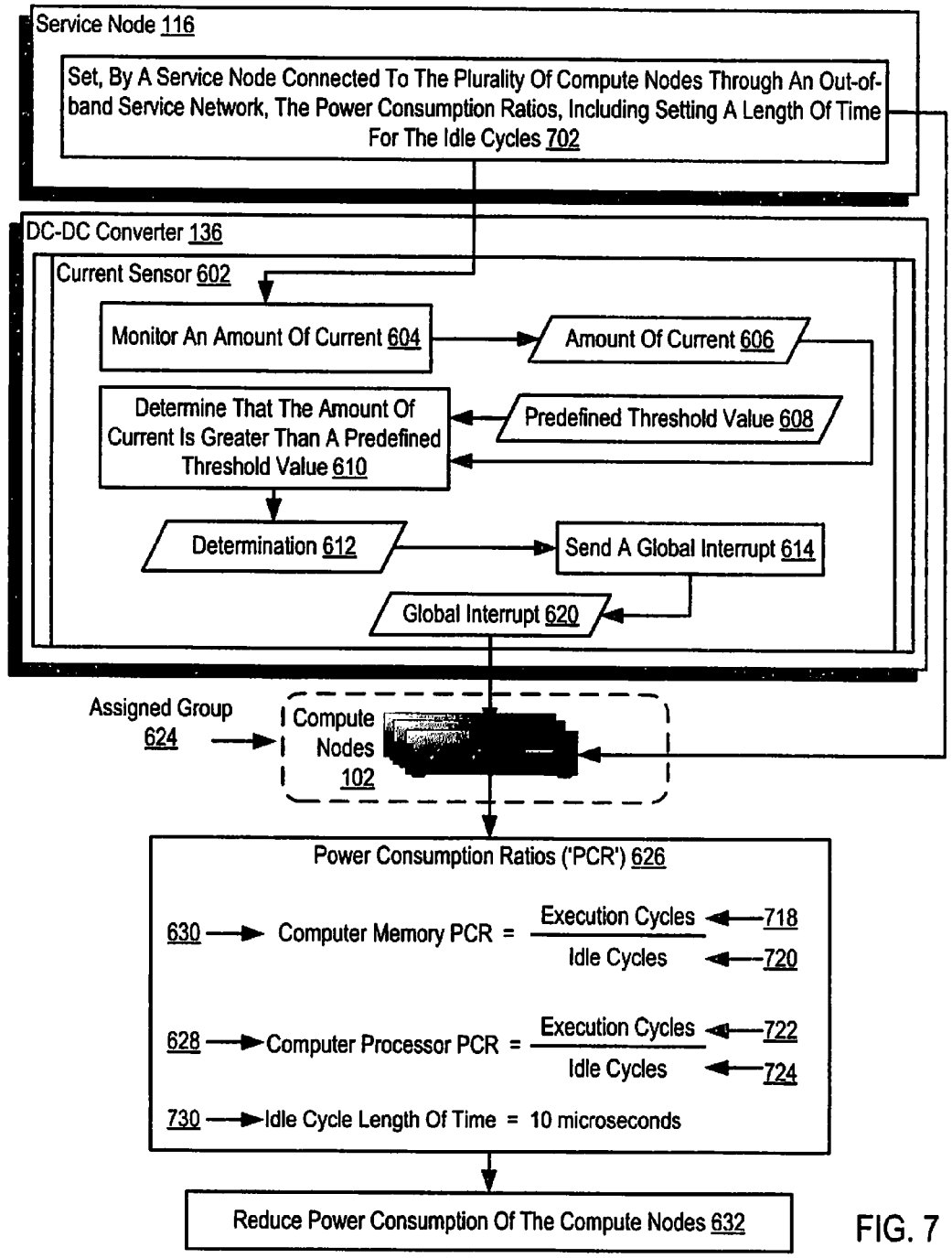
FIG. 7 sets forth a flow chart illustrating a further exemplary method for managing power in a parallel computer according to embodiments of the present invention.

For further explanation, FIG. 7 sets forth a flow chart illustrating a further exemplary method for managing power in a parallel computer according to embodiments of the present invention. The method of FIG. 7 is similar to the method of FIG. 6 in that the method of FIG. 7 includes monitoring (604), by the current sensor (602) in each DC-DC converter (136), an amount (606) of current supplied by that DC-DC converter (136) to its assigned group (624) of compute nodes (102); determining (610), by at least one DC-DC converter (136), that the amount (606) of current supplied to its assigned group (624) of compute nodes (102) is greater than a predefined threshold value (608); sending (614), by the at least one DC-DC converter (136) to the plurality of compute nodes (102) in response to the determination (612) that the amount (606) of current supplied to its assigned group (624) of compute nodes (102) is greater than the predetermined threshold value (608), a global interrupt (620), including notifying (616) the plurality of compute nodes (102) to reduce power consumption; and responsive to the notification (622) to reduce power consumption, reducing (632), by the plurality of compute nodes (102) in accordance with power consumption ratios (626), power consumption of the compute nodes (102), the power consumption ratios (626) including a computer processor power consumption ratio (628) and a computer memory power consumption ratio (630).

The method of FIG. 7 differs from the method of FIG. 6, in that in the method of FIG. 7 the power consumption ratios (626) are expressed as a ratio of execution cycles (718,722) to idle cycles (722,724). Consider as an example the following power consumption ratios:

computer processor power consumption ratio=1/10
computer memory power consumption ratio=2/5

During operation, the compute nodes may reduce power according to the example power consumption ratios above by the compute node's computer processor executing instructions for one cycle then idling ten cycles. The computer memory will execute instructions for two cycles then idle five cycles.

The method of FIG. 7 also includes setting (702), by a service node (116) connected to the plurality of compute nodes (102) through an out-of-band service network, such as JTAG network (104 on FIG. 1), the power consumption ratios (626), including setting a length of time (730) for the idle cycles (720,724). Setting (702), by a service node (116) connected to the plurality of compute nodes (102) through an out-of-band service network, such as JTAG network (104 on FIG. 1), the power consumption ratios (626), including setting a length of time (730) for the idle cycles (720,724) may be carried out by configuring the computer memory in each compute node with the power consumption ratios (630,628) and the length of time (730) for the idle cycles. The greater the length of time of an idle cycle the longer a computer processor or computer memory in a compute node idles during such an idle cycle. In the example of FIG. 6, the idle cycle length of time (730) is set to 10 microseconds. That is, when operating in accordance with the power consumption ratios, each cycle that a computer processor or computer memory idles lasts 10 microseconds.

In the example of FIG. 7 the computer processor power consumption ratio (628) may equal the computer memory power consumption ratio (630). That is, the service node may set a single ratio for the two power consumption ratios (714, 716). Alternatively, the service node may set a different ratio for each power consumption ratio. In such a case, the computer processor power consumption ratio (628) does not equal the computer memory power consumption ratio (638). Using distinct power consumption ratios (630,628) enables precise control of power consumption in the parallel computer.

Exemplary embodiments of the present invention are described largely in the context of a fully functional computer system for managing power in a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing power in a parallel computer, the parallel computer comprising a power supply and a plurality of compute nodes, each compute node comprising a computer processor and computer memory operatively coupled to the computer processor, the plurality of compute nodes powered by the power supply through a plurality of direct current to direct current ('DC-DC') converters, each DC-DC converter supplying current to an assigned group of compute nodes, each DC-DC converter having a current sensor, the method comprising:

monitoring, by the current sensor in each DC-DC converter, an amount of current supplied by that DC-DC converter to its assigned group of compute nodes;

determining, by the at least one DC-DC converter, that the amount of current supplied to its assigned group of compute nodes is greater than a predefined threshold value;

sending, by the at least one DC-DC converter to the plurality of compute nodes in response to the determination that the amount of current supplied to its assigned group of compute nodes is greater than the predetermined threshold value, a global interrupt, including notifying the plurality of compute nodes to reduce power consumption; and responsive to the notification to reduce power consumption, reducing, by the plurality of compute nodes in accordance with power consumption ratios, power consumption of the compute nodes, the power consumption ratios including a computer processor power consumption ratio and a computer memory power consumption ratio.

2. The method of claim 1 wherein the power consumption ratios further comprises a ratio of execution cycles to idle cycles.

3. The method of claim 2 further comprising setting, by a service node connected to the plurality of compute nodes through an out-of-band service network, the power consumption ratios, including setting a length of time for the idle cycles.

4. The method of claim 1 wherein the computer processor power consumption ratio is equal to the computer memory power consumption ratio.

5. The method of claim 1 wherein the computer processor power consumption ratio is not equal to the computer memory power consumption ratio.

6. The method of claim 1 wherein the plurality of compute nodes are connected for data communications through a plurality of data communications networks, at least one data communications network optimized for point to point data communications and at least one data communications network optimized for collective operations.

7. Apparatus for managing power in a parallel computer, the parallel computer comprising a power supply and a plurality of compute nodes, each compute node comprising a computer processor and computer memory operatively coupled to the computer processor, the plurality of compute nodes powered by the power supply through a plurality of direct current to direct current ('DC-DC') converters, each DC-DC converter supplying current to an assigned group of compute nodes, each DC-DC converter having a current sensor, the apparatus comprising a computer processor, a computer memory operatively coupled to the computer processor, the computer memory having disposed within it computer program instructions capable of:

monitoring, by the current sensor in each DC-DC converter, an amount of current supplied by that DC-DC converter to its assigned group of compute nodes;

determining, by the at least one DC-DC converter, that the amount of current supplied to its assigned group of compute nodes is greater than a predefined threshold value;

sending, by the at least one DC-DC converter to the plurality of compute nodes in response to the determination that the amount of current supplied to its assigned group of compute nodes is greater than the predetermined threshold value, a global interrupt, including notifying the plurality of compute nodes to reduce power consumption; and responsive to the notification to reduce power consumption, reducing, by the plurality of compute nodes in accordance with power consumption ratios, power consumption of the compute nodes, the power consumption ratios including a computer processor power consumption ratio and a computer memory power consumption ratio.

8. The apparatus of claim 7 wherein the power consumption ratios further comprises a ratio of execution cycles to idle cycles.

9. The apparatus of claim 8 further comprising computer program instructions capable of setting, by a service node connected to the plurality of compute nodes through an out-of-band service network, the power consumption ratios, including setting a length of time for the idle cycles.

10. The apparatus of claim 7 wherein the computer processor power consumption ratio is equal to the computer memory power consumption ratio.

11. The apparatus of claim 7 wherein the computer processor power consumption ratio is not equal to the computer memory power consumption ratio.

12. The apparatus of claim 7 wherein the plurality of compute nodes are connected for data communications through a plurality of data communications networks, at least one data communications network optimized for point to point data communications and at least one data communications network optimized for collective operations.

13. A computer program product for managing power in a parallel computer, the parallel computer comprising a power supply and a plurality of compute nodes, each compute node comprising a computer processor and computer memory operatively coupled to the computer processor, the plurality of compute nodes powered by the power supply through a plurality of direct current to direct current ('DC-DC') converters, each DC-DC converter supplying current to an assigned group of compute nodes, each DC-DC converter having a current sensor, the computer program product disposed in a recordable media, the computer program product comprising computer program instructions capable of:

monitoring, by the current sensor in each DC-DC converter, an amount of current supplied by that DC-DC converter to its assigned group of compute nodes;

determining, by the at least one DC-DC converter, that the amount of current supplied to its assigned group of compute nodes is greater than a predefined threshold value;

sending, by the at least one DC-DC converter to the plurality of compute nodes in response to the determination that the amount of current supplied to its assigned group of compute nodes is greater than the predetermined threshold value, a global interrupt, including notifying the plurality of compute nodes to reduce power consumption; and responsive to the notification to reduce power consumption, reducing, by the plurality of compute nodes in accordance with power consumption ratios, power consumption of the compute nodes, the power consumption ratios including a computer processor power consumption ratio and a computer memory power consumption ratio.

14. The computer program product of claim 13 wherein the power consumption ratios further comprises a ratio of execution cycles to idle cycles.

15. The computer program product of claim 14 further comprising computer program instructions capable of setting, by a service node connected to the plurality of compute nodes through an out-of-band service network, the power consumption ratios, including setting a length of time for the idle cycles.

16. The computer program product of claim 13 wherein the computer processor power consumption ratio is equal to the computer memory power consumption ratio.

17. The computer program product of claim 13 wherein the computer processor power consumption ratio is not equal to the computer memory power consumption ratio.

18. The computer program product of claim 13 wherein the plurality of compute nodes are connected for data communications through a plurality of data communications networks, at least one data communications network optimized for point to point data communications and at least one data communications network optimized for collective operations.

19. The computer program product of claim 13 wherein the signal bearing medium comprises a recordable medium.

20. The computer program product of claim 13 wherein the signal bearing medium comprises a transmission medium.

* * * * *